United States Patent
Zhang et al.

(10) Patent No.: US 11,468,548 B2
(45) Date of Patent: Oct. 11, 2022

(54) DETAIL RECONSTRUCTION FOR SDR-HDR CONVERSION

(71) Applicant: Disney Enterprises, Inc., Burbank, CA (US)

(72) Inventors: Yang Zhang, New York, NY (US); Tunc Aydin, Zurich (CH)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/948,006

(22) Filed: Aug. 27, 2020

(65) Prior Publication Data
US 2022/0067890 A1    Mar. 3, 2022

(51) Int. Cl.
*G06T 5/00* (2006.01)
*G06T 9/00* (2006.01)
*G06T 5/20* (2006.01)

(52) U.S. Cl.
CPC ............. *G06T 5/009* (2013.01); *G06T 5/005* (2013.01); *G06T 5/20* (2013.01); *G06T 9/002* (2013.01); *G06T 2207/20081* (2013.01); *G06T 2207/20208* (2013.01)

(58) Field of Classification Search
None
See application file for complete search history.

(56) References Cited

U.S. PATENT DOCUMENTS

| | | | | |
|---|---|---|---|---|
| 2013/0070965 | A1* | 3/2013 | Jang | H04N 5/2355 382/103 |
| 2014/0050417 | A1* | 2/2014 | Jiang | G06T 5/002 382/261 |
| 2015/0302562 | A1* | 10/2015 | Zhai | H04N 19/46 382/233 |
| 2016/0292824 | A1* | 10/2016 | Li | G06T 5/002 |
| 2019/0080440 | A1* | 3/2019 | Eriksson | G06N 5/00 |
| 2021/0166360 | A1* | 6/2021 | Kim | G06F 17/11 |

OTHER PUBLICATIONS

Y. Endo, Y. Kanamori, and J. Mitani. 2017. Deep Reverse Tone Mapping. ACM Trans.Graph. 36, 6, Article 177 (2017). (Year: 2017).*
Shao, Pan, et al. "Edge-preserving image decomposition via joint weighted least squares." Computational Visual Media 1.1 (2015): 37-47. (Year: 2015).*
Eilertsen, Gabriel, et al. "HDR image reconstruction from a single exposure using deep CNNs." ACM transactions on graphics (TOG) 36.6 (2017): 1-15. (Year: 2017).*

(Continued)

*Primary Examiner* — Andrae S Allison
(74) *Attorney, Agent, or Firm* — Farjami & Farjami LLP

(57) ABSTRACT

The exemplary embodiments relate to converting standard dynamic range (SDR) content to high dynamic range (HDR) content. An SDR image may be decomposed into a base layer of the SDR image that includes low frequency information from the SDR image and a detail layer of the SDR image that includes high frequency information from the SDR image. A base layer of an HDR image may be generated using the base layer of the SDR image and a detail layer of the HDR image may be generated using the detail layer of the SDR image. An HDR image is then generated using the base layer of the HDR image and the detail layer of the HDR image.

14 Claims, 9 Drawing Sheets

SDR image 105

HDR image 110

(56) References Cited

OTHER PUBLICATIONS

Liu, Guilin, et al. "Image inpainting for irregular holes using partial convolutions." Proceedings of the European Conference on Computer Vision (ECCV). 2018. (Year: 2018).*
Xie, Xianghui, Laurens Meeus, and Aleksandra Pizurica. "Partial convolution based multimodal autoencoder for ART investigation." 31st Benelux Conference on Artificial Intelligence (BNAIC 2019) and the 28th Belgian Dutch Conference on Machine Learning (Benelearn 2019). vol. 2491. 2019. (Year: 2019).*
Liu, Y.L., Lai, W.S., Chen, Y.S., Kao, Y.L., Yang, M.H., Chuang, Y.Y. and Huang, J.B., Apr. 2, 2020. Single-image HDR reconstruction by learning to reverse the camera pipeline. In Proceedings of the IEEE/CVF Conference on Computer Vision and Pattern Recognition (pp. 1651-1660). (Year: 2020).*
Yannick Hold-Geoffroy, Kalyan Sunkavalli, Sunil Hadap, Emiliano Gambaretto, Jean-François Lalonde "Deep Outdoor Illumination Estimation" ResearchGate, Jul. 2017. pp. 1-11.
Gabriel Eilertsen, Joel Kronander, Gyorgy Denes, Rafal K. Mantiuk, Jonas Unger "HDR image reconstruction from a single exposure using deep CNNs" ACM Transactions on Graphics, vol. 36, No. 6, Article 178. Publication date: Nov. 2017. pp. 1-15.
Jiahui Yu, Zhe Lin, Jimei Yang, Xiaohui Shen, Xin Lu, Thomas S. Huang "Generative Image Inpainting with Contextual Attention" Computer Vision Foundation (CVF) pp. 5505-5514.

\* cited by examiner

DETAIL RECONSTRUCTION FOR SDR-HDR CONVERSION

BACKGROUND INFORMATION

A display device may support Standard Dynamic Range (SDR) content and High Dynamic Range (HDR) content. Compared to SDR content, HDR content may support a greater dynamic range of luminosity, more contrast and a wider range of colors. Therefore, HDR content may provide a better viewing experience.

In SDR content some visual details may be clipped due to quantization and insufficient dynamic range. Typically, the clipping occurs around highlights and has an adverse effect on the viewing experience of the SDR content. To provide an example, clipped highlights may lose high-frequency texture information at their brightest spots where the texture is replaced by a uniform colored region. To provide another example, the low-frequency luminance profile of the highlight is altered due to clipping. In addition to the adverse effects clipping may have on the visual presentation of SDR content, the clipped details also present a challenge for SDR to HDR conversion.

DETAILED DESCRIPTION

The exemplary embodiments may be further understood with reference to the following description and the related appended drawings, wherein like elements are provided with the same reference numerals. The exemplary embodiments relate to converting standard dynamic range (SDR) content to high dynamic range (HDR) content. As will be described in more detail below, the exemplary embodiments include various techniques for reconstructing clipped details when converting SDR content to HDR content.

The exemplary embodiments are described with regard to SDR and HDR. Generally, these terms refer to an image/video format that is capable of a particular dynamic range of luminosity. For example, SDR content may be configured with a dynamic range of luminosity that is based on a conventional gamma curve or any other standard range. In contrast, HDR content may be configured with a dynamic range of luminosity that exceeds the standard dynamic range of luminosity. Further, HDR content may also support a wider color gamut compared to SDR content. Therefore, HDR content may provide a better viewing experience.

There are multiple variations of SDR and HDR. The exemplary embodiments are not limited to any particular type of SDR or HDR. Those skilled in the art will understand the scope of the terms SDR and HDR and how they are distinct from one another. Accordingly, throughout this description, SDR content may refer to image or video data configured with certain display related parameters that are restricted to a standard range and HDR content may refer to image or video data configured with one or more display parameters that have a range that exceeds what is considered standard.

As indicated above, clipped details in SDR content pose a challenge for SDR to HDR conversion. The exemplary embodiments address these challenges by reconstructing the low-frequency luminance profile and high-frequency texture separately using two distinct neural networks. To provide a general example, consider a scenario in which an SDR image depicting a scene that includes a bright light bulb is to be converted into an HDR image. As mentioned above, details near the light bulb may be clipped and create a uniform colored region (e.g., white). A first exemplary neural network is trained to replace the clipped region with a smooth luminance profile that recovers the low-frequency information. A second exemplary neural network is trained to hallucinate the missing high-frequency texture to reproduce the appearance of the scene before the details were clipped. As a result, the clipped details in the input SDR image may be reconstructed in the output HDR image.

The exemplary neural networks referenced above are only one aspect of the exemplary SDR to HDR conversion techniques described herein. As will be explained in more detail below, initially, an input SDR image may decomposed into a base layer and a detail layer. Specific examples of image decomposition will be described in more detail below. One of the exemplary neural networks referenced above may then process the SDR base layer to generate an HDR base layer. The other exemplary neural network referenced above may process the SDR detail layer and generate an HDR detail layer. Subsequently, another exemplary neural network is trained to output an HDR image using the HDR base layer and the HDR detail layer. Specific examples of training these types of neural networks and how they may be used for SDR to HDR conversion will be explained in more detail below. However, any reference to a particular type of neural network or machine learning approach is merely provided for illustrative purposes, different entities may refer to a similar concept by a different name. Further, the exemplary embodiments described herein may be used in conjunction with other currently implemented SDR to HDR conversion techniques, future implementations of SDR to HDR conversion techniques or independently from other SDR to HDR conversion techniques.

Figure 1:
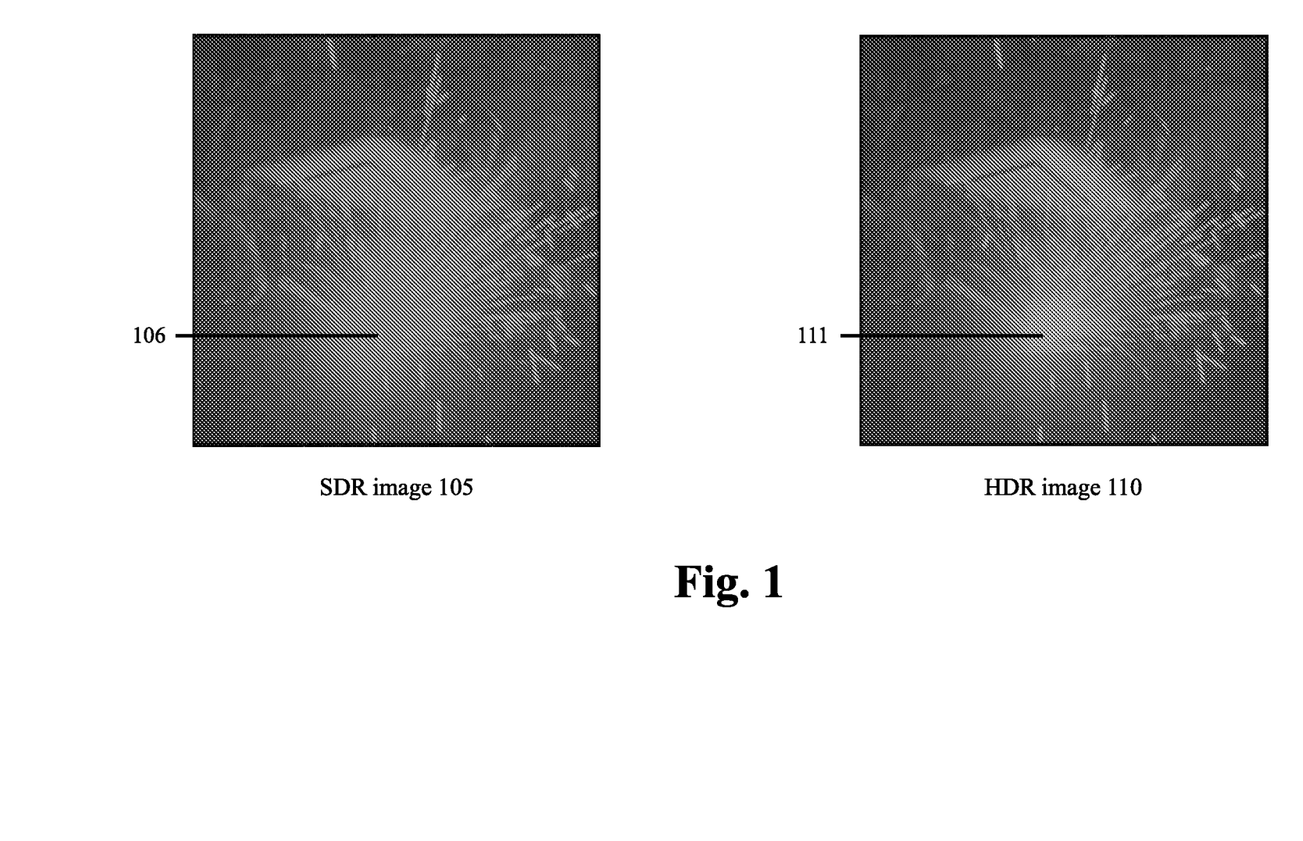
FIG. 1 illustrates an example of standard dynamic range (SDR) input and high dynamic range (HDR) output using the exemplary techniques described herein.

FIG. 1 illustrates an example of SDR input and HDR output using the exemplary techniques described herein. FIG. 1 includes an SDR image 105 and an HDR image 110. Both images 105, 110 depict the same scene of a person in a welder's mask using a welding device. In the SDR image 105 there are various clipped details surrounding reference point 106. For example, a uniform colored region is shown surrounding reference point 106 due to the clipped details. In contrast, the corresponding HDR image 110 shows details surrounding reference point 111. As will be described below, the exemplary techniques reconstruct the clipped details in the SDR image 105 when converting the SDR image 105 into the HDR image 110. These images 105, 110 are not intended to limit the exemplary embodiments in any way. Instead, these images 105, 110 are merely intended to provide an example of SDR input and HDR output using the exemplary techniques described herein.

Figure 2:
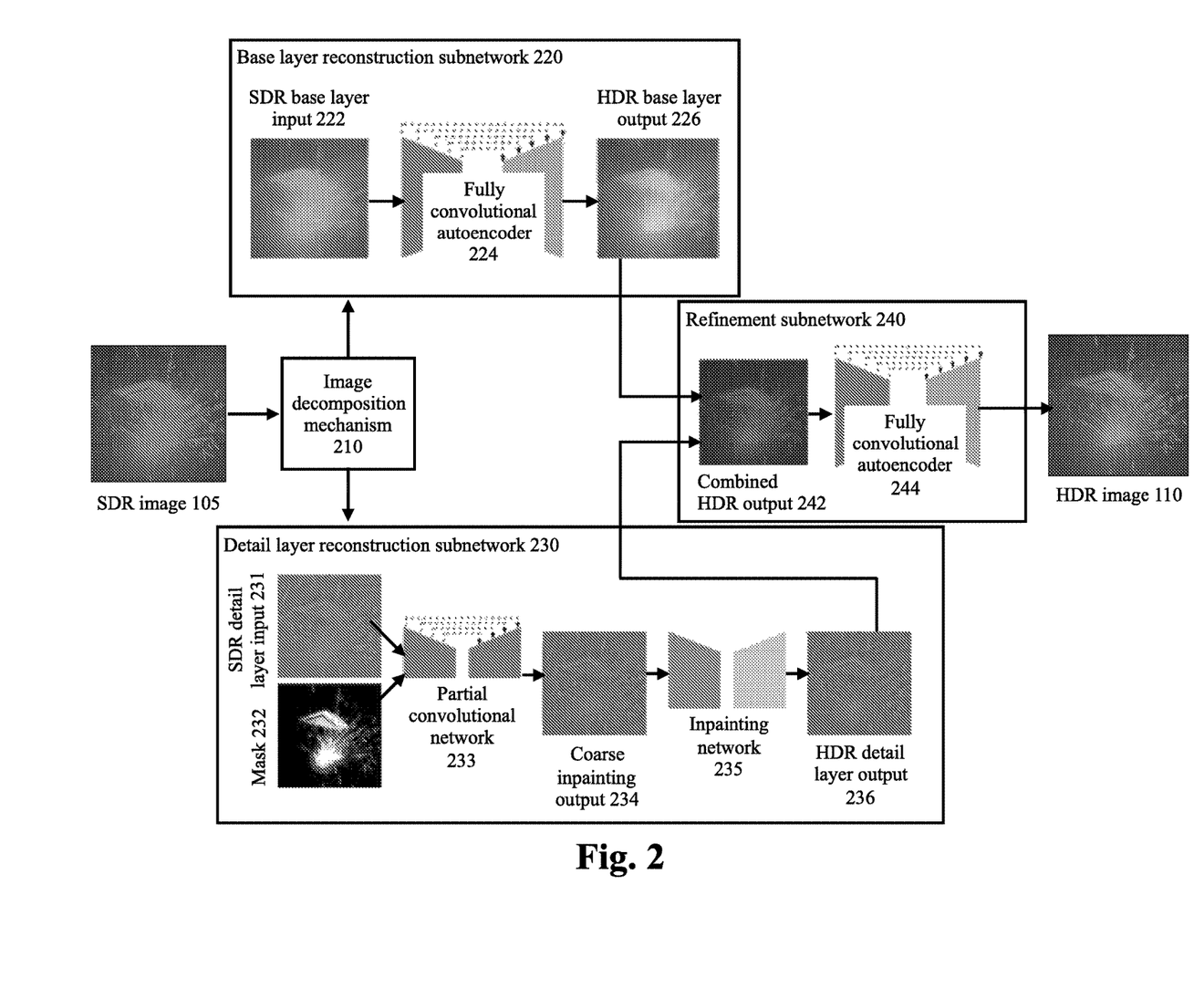
FIG. 2 shows a data flow within an HDR reconstruction network architecture according to various exemplary embodiments.

FIG. 2 shows an exemplary data flow within an HDR reconstruction network architecture 200 according to various exemplary embodiments. The HDR reconstruction network architecture 200 includes an image decomposition mechanism 210, a base layer reconstruction subnetwork 220, a detail layer reconstruction subnetwork 230 and a refinement subnetwork 240. FIG. 2 will be described with regard to the SDR image 105 and the HDR image 110 of FIG. 1.

Those skilled in the art will understand that the components of the HDR reconstruction network architecture 200 may include any appropriate combination of hardware, software or firmware. Specific examples of the type of hardware, software or firmware that may be utilized will be described with regard to FIG. 9.

Initially, the SDR input image 105 is processed by the image decomposition mechanism 210. The image decomposition mechanism 210 performs one or more operations to decompose the SDR input image 105 into SDR base layer input 222 and SDR detail layer input 231. The SDR base layer input 222 contains most of the low frequency brightness and color information. The SDR detail layer input 231 contains high frequency information such as texture and edges. In other words, the image decomposition mechanism 210 takes the SDR input 105 breaks it down into two layers. These layers are then individually processed and combined to form the reconstructed HDR output image 110.

To provide an example, the image decomposition mechanism 210 may initially decompose the input SDR image 105 (I) into the SDR base layer input 222 ($I_b$) using a filter. In some embodiments, the image decomposition mechanism 210 may employ a weighted least squares (WLS) filter. The WLS filter may be configured to prevent halo artifacts by minimizing a function whose data term penalizes the distance between the original image (e.g., the SDR input image 105) and the filtered image (e.g., SDR base layer input 222). However, reference to a WLS filter is merely provided for illustrative purposes, any appropriate type of filter or mechanism may be used.

The SDR detail layer input 231 ($I_d$) may be obtained by dividing the input SDR image 105 (I) by the SDR base layer input 222 ($I_b$). In this example, element wise division may be performed to obtain ($I_d$). Therefore, the SDR base layer input 222 not only provides the input for the base layer reconstruction subnetwork 220 it also may be used to generate the input for the detail layer reconstruction subnetwork 230.

The image decomposition mechanism 210 may also be configured to perform masking. The outputted mask 232 may be used by the detail layer reconstruction subnetwork 230 for HDR prediction and pixel wise blending. The linear blending using the mask may prevent banding artifacts between the predicted pixel and their surroundings. How the mask 232 may be utilized will be described in more detail below with regard to FIGS. 5-7.

To provide an example of generating the mask 232, a three-layer mask (M) may be calculated on each color channel (c) for indicating the over-exposed and saturated regions of the SDR input image 105 at a threshold (t). This calculation for each layer ($M_c$) may be performed using the following formula:

$$M_c = \frac{\max(0, \max_c(I_b) - t}{1 - t}$$

The base layer reconstruction subnetwork 220 may represent a neural network configured for HDR brightness and color gamut prediction. In this example, the base layer reconstruction subnetwork 220 may be a supervised learning neural network using fully convolutional autoencoder architecture. In FIG. 2, a representation of the fully convolutional autoencoder neural network is illustrated as 224. However, the exemplary embodiments are not limited to any particular type of neural network and any appropriate machine learning system may be utilized for base layer reconstruction.

Those skilled in the art will understand that a supervised learning neural network performs the task of learning a function that maps an input to an output using training input-output pairs. In this context, the training input-output pairs may be one or more pairs of an SDR base layer and a corresponding HDR base layer. Those skilled in the art will also understand that an autoencoder is a type of neural network that is configured to learn how to encode data and then generate a decoded representation from the encoded data. In this context, SDR base layer input may be encoded and HDR base layer output may be predicted by decoding the encoded SDR base layer input.

Once trained, the base layer reconstruction subnetwork 220 may be used to infer HDR content from SDR input. For instance, the SDR base layer input 222 may be used to predict HDR base layer output 226. Additional details about this neural network will be described below with regard to FIGS. 3-4.

The detail layer reconstruction subnetwork 230 may represent a neural network configured for high frequency texture prediction. In this example, the detail layer reconstruction subnetwork 230 includes a partial convolutional network 233 configured for reconstruction loss and structure similarity loss explicitly. During operation, the partial convolutional network 233 may generate coarse inpainting output 234. The detail layer reconstruction subnetwork 230 may also include an inpainting network 235 configured for reconstruction, global and local adversarial loss. During operation, the inpainting network 235 may predict the HDR detail layer output 236. However, the exemplary embodiments are not limited to any particular type of neural network and any appropriate machine learning system may be utilized for detail layer reconstruction.

Once trained, the detail layer reconstruction subnetwork 230 may be used to reconstruct clipped details in the SDR input image 105. For instance, the SDR detail layer input 231 may be used to predict HDR detail layer output 236. Additional details about this neural network will be described below with regard to FIGS. 5-7.

The refinement subnetwork 240 may represent a neural network configured to generate the final HDR output (e.g., HDR output image 110). Similar to the base layer reconstruction subnetwork 220, the refinement network 240 may be a supervised learning neural network using fully convolutional autoencoder architecture. In this example, the refinement subnetwork 240 uses the HDR base layer output 226 and the HDR detail layer output 236 as input and combines them to generate combined HDR output 242. The combined HDR output 242 is input into the fully convolutional autoencoder architecture 244 to generate the HDR output image 110. The refinement subnetwork 240 may be further configured to remove undesired artifacts from the combined HDR base layer output 226 and the HDR detail layer output 236. However, the exemplary embodiments are not limited to any particular type of neural network and any appropriate machine learning system may be utilized for generating HDR output. Additional details about this neural network will be described below with regard to FIGS. 3 and 8.

There is an artistic aspect to HDR reconstruction. Therefore, from a user perspective, it may be desirable to manually edit the output from any of the above referenced subnetworks 220-240 to retain artistic control over the reconstructed HDR image. Accordingly, in some embodiments, a representation of the output from any of the subnetworks 220-240 may be displayed on a graphical user interface (GUI) that is configured to receive user input. For example, a set of tonal curves may be generated from the output of any of the subnetworks 220-240. The tonal curves may be displayed on the GUI and configured with control points that the user may manipulate via user input. There may be multiple tone curves for different color channels. Thus, the user may retain artistic control over the conversion process by manually editing the tonal curves.

The above examples describe how an SDR image may be converted into an HDR image. The examples provided below will describe how each of the above referenced subnetworks 220-240 may be trained to perform the operations described above.

Figure 3:
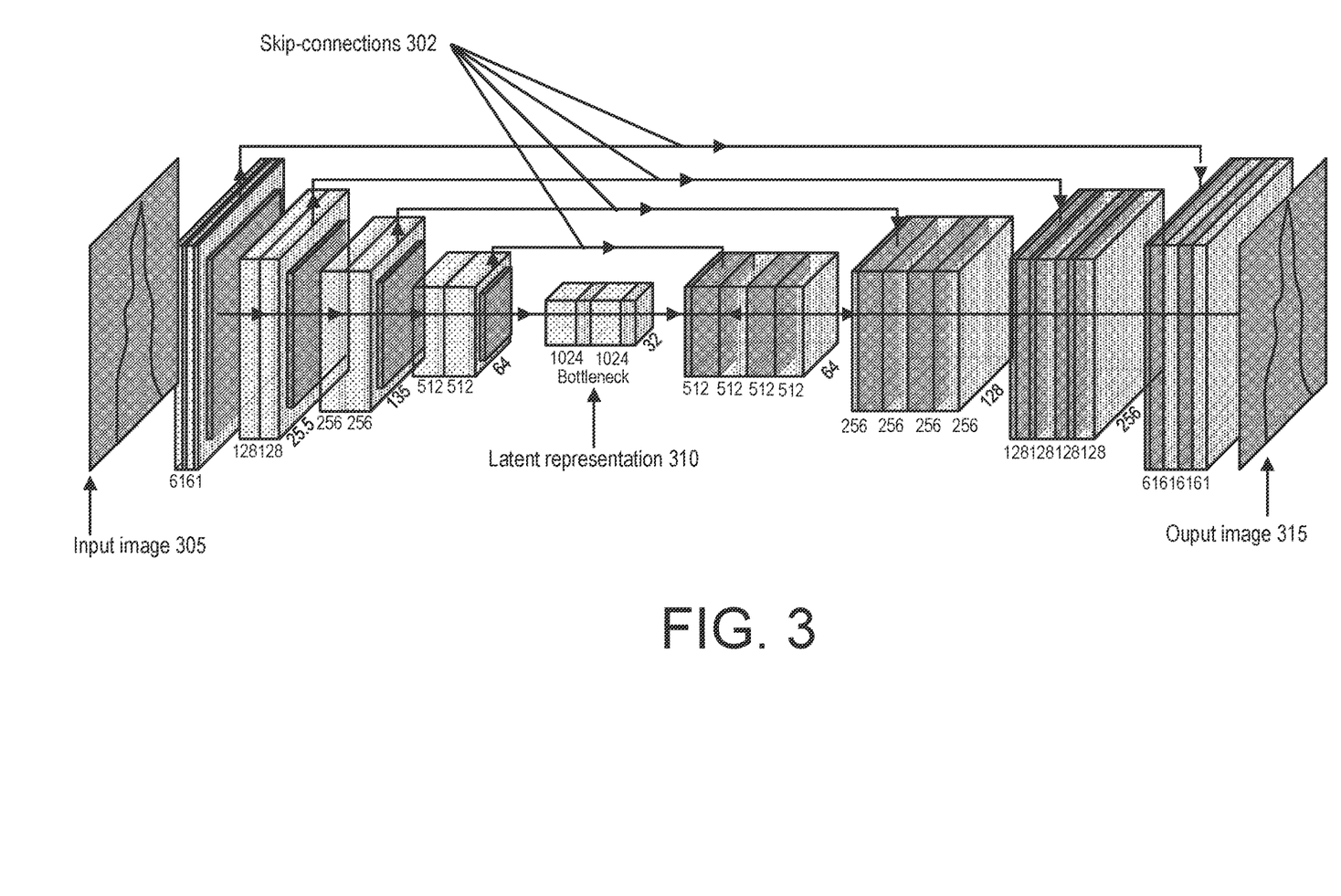
FIG. 3 illustrates an autoencoder network architecture with fully convolutional layers and skip-links between encoder and decoder.

Prior to discussing how to train the base layer reconstruction subnetwork 220, a description of the neural network architecture is provided below. FIG. 3 illustrates an autoencoder network architecture with fully convolutional layers and skip-links between encoder and decoder.

FIG. 3 includes an input image 305 and an output image 315. As mentioned above, an autoencoder is a type of neural network that is configured to learn how to encode data and then generate a decoded representation from the encoded data. Thus, using the input image 305, the neural network may encode the input image into a low dimensional latent representation 310. The latent representation 310 may then be decoded to generate the output image 315.

The skip-connections 302 from each encoder layer to its corresponding decoder layer enables local detail information reconstruction during decoding. In the decoder, concatenation of the convolutional layers in the encoder and corresponding decoder layers may be applied. In some embodiments, 3×3 kernel sizes may be used to generate feature maps for all of the convolutional layers. Further, max-pooling may be employed in the encoder and up-sampling may be employed in the decoder. In some embodiments, this neural network may be trained using rectified linear unit (ReLU) activation for all the convolutional layers.

As indicated above this network architecture may be employed by the base layer reconstruction subnetwork 220 and the refinement subnetwork 240. Method 400 of FIG. 4 describes how to train this type of neural network to perform the operations described above for the base layer reconstruction subnetwork 220. Method 800 of FIG. 8 describes how to train this type of neural network to perform the operations described above for the refinement subnetwork 240.

Figure 4:
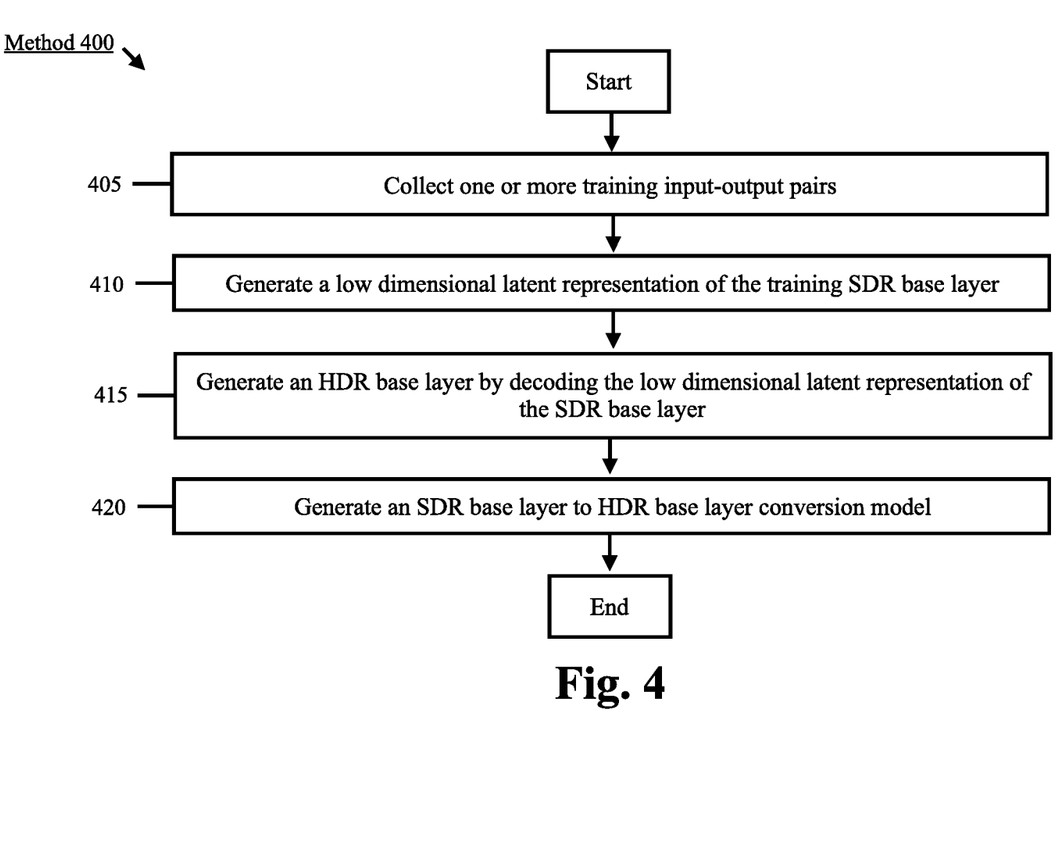
FIG. 4 shows a method for training the base layer reconstruction subnetwork according to various exemplary embodiments.

FIG. 4 shows a method 400 for training the base layer reconstruction network 220 according to various exemplary embodiments. Those skilled in the art will understand that the operations described below may be performed by any appropriate combination of hardware, software or firmware configured to implement the exemplary techniques described herein. Specific examples of the type of hardware, software or firmware that may be utilized will be described below with regard to FIG. 9.

In 405, one or more training input-output pairs are collected. In this example, each input-output pair may include a SDR base layer and a corresponding HDR base layer. Those skilled in the art will understand that the exemplary concepts described herein may be applicable to any appropriate type of image or video data. For example, video data including multiple frames may be used for training.

Throughout this description, an image may be characterized as a "training image" when the image is to be used to train a neural network. For example, a training SDR base layer and a training HDR base layer may form a pair of training images. The method 400 will be described with regard to a single pair of training images. However, in an actual training process, a training dataset of multiple pairs of training images may be utilized to train the base layer reconstruction subnetwork 220.

In 410, a low dimensional latent representation of the training SDR base layer is generated. For example, as discussed above with regard to FIGS. 2-3, an input image may be encoded by the autoencoder architecture. In 415, an HDR base layer is generated by decoding the low latent representation of the SDR base layer. During training, the neural network attempts to generate an HDR base layer that is at least similar to the training HDR base layer corresponding to the training SDR base layer.

In 420, an SDR base layer to HDR base layer conversion model is generated based on processing the training dataset. During training, the neural network may learn an SDR to HDR conversion model ($F_b$) using the following formula:

$$H_b = F_b(S_b; \theta)$$

Here, ($S_b$) represents the input training SDR base layer, ($H_b$) represents the output HDR base layer and ($\theta$) represents model parameters. For training, the above formula may be configured as an optimization task where the neural network attempts to predict $H_b$ as accurate as possible to the training HDR image ($H_{tb}$) by minimizing a loss function, $\mathcal{L}$ using the following formula:

$$\mathcal{L} = \frac{1}{n}\sum_{i=1}^{n}|H_{tb} - H_b|$$

Here, n represents the total number of pixels and i represents the pixel index. Once learned, the SDR base layer to HDR base layer conversion model $\mathcal{F}$ may be used to generate an HDR base layer from SDR base layer input. For example, within the context of the data flow shown in FIG. 2, the SDR base layer to HDR base layer conversion model may be applied to the SDR base layer input 222 to generate the HDR base layer output 226.

Figure 5:
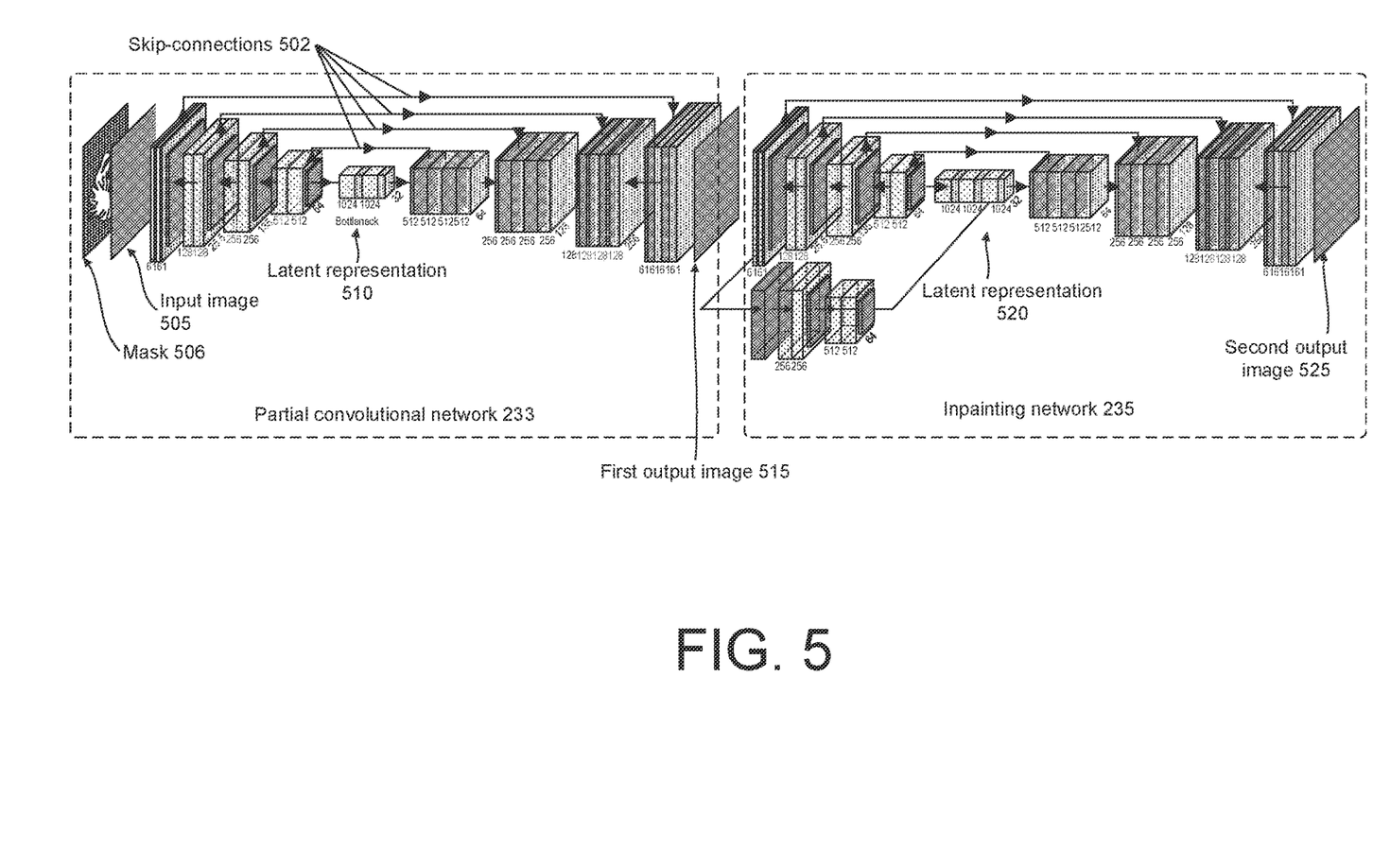
FIG. 5 illustrates the architecture of the partial convolutional network architecture and the inpainting network of the detail layer reconstruction subnetwork according to various exemplary embodiments.

FIG. 5 illustrates the architecture of the partial convolutional network architecture 233 and the inpainting network 235 of the detail layer reconstruction subnetwork 230 according to various exemplary embodiments.

The partial convolutional network 233 includes an input image 505 and a first output image 515 (e.g., coarse inpainting output). Similar to the autoencoder architecture described above, the partial convolutional network 233 employs a U-net like model which includes an encoder and decoder. Thus, using the input image 505, the neural network may encode the input image into a latent representation 510. The latent representation 510 may then be decoded to generate the first output image 515. As indicated above, the partial convolutional network 233 may also employ a three layer channel-wise mask 506 for different color channels. Thus, in addition to the input image 505, the mask 506 may also be utilized by the neural network to generate the first output image 515.

The skip-connections 502 from each encoder layer to its corresponding decoder layer enables local detail information reconstruction during decoding. Here, concatenation of the convolutional layers in the encoder and corresponding decoder layers may be applied. In some embodiments, 7×7 kernel sizes are used for the first layer of the partial convolutional network 233, 5×5 kernel sizes are used for the second layer of the partial convolutional network 233 and 3×3 kernel sizes are used for the rest of layers of the partial convolutional network 233. Further, max-pooling may be employed in the encoder and up-sampling may be employed in the decoder.

The inpainting network 235 uses the first output image 515 as input and further includes a second output image 525. The inpainting network 235 employs a contextual attention layer which learns to copy feature information from known surrounding features in latent space to generate meaningful texture in masked locations. This contextual attention layer will be described in greater detail below. Thus, the first output image 515 may be encoded into a latent representation 520. The latent representation 520 may then be decoded to generate the second output image 525.

In addition to the contextual attention layer, concatenation of the convolutional layers in the encoder and corresponding decoder layers may be applied. Further, max-pooling may be employed in the encoder and up-sampling may be employed in the decoder. In some embodiments, 3×3 kernel size may be used on all of the convolutional layers.

Figure 6:
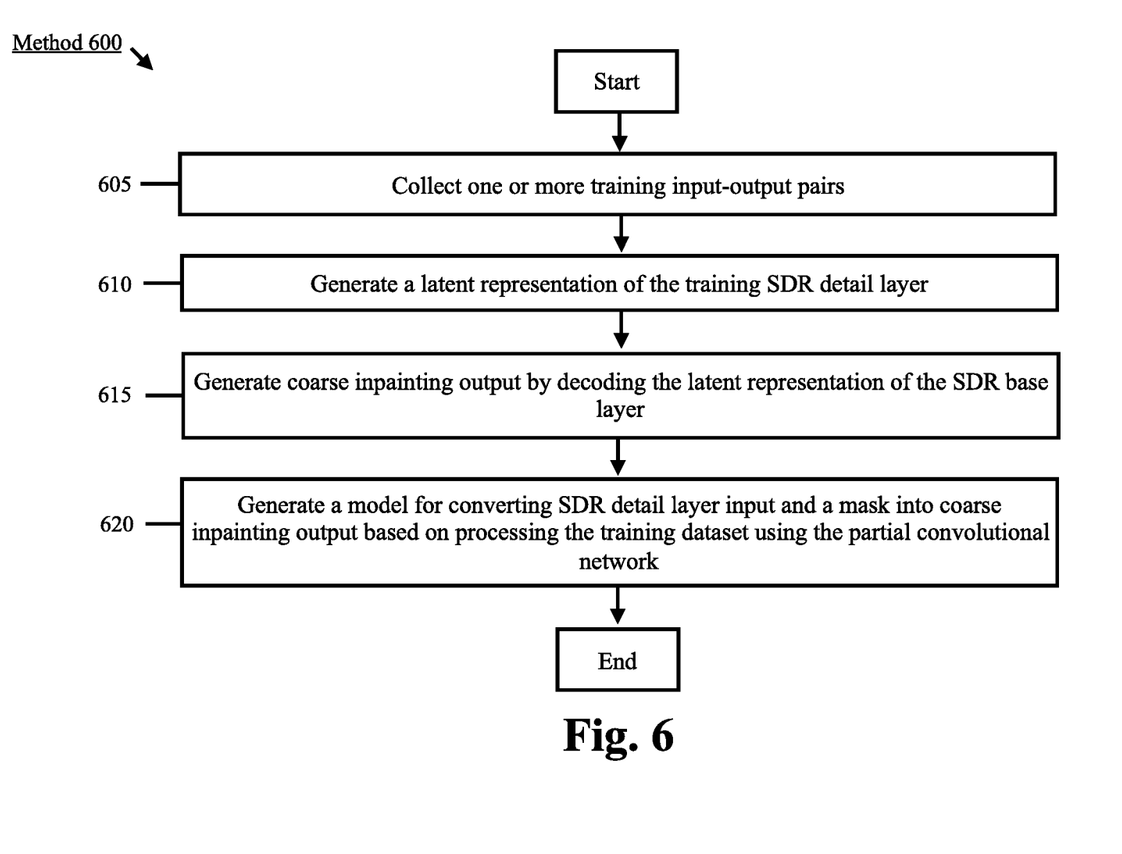
FIG. 6 shows a method for training the partial convolutional network of the detail layer reconstruction subnetwork according to various exemplary embodiments.

FIG. 6 shows a method 600 for training the partial convolutional network 233 of the detail layer reconstruction subnetwork 230 according to various exemplary embodiments. Those skilled in the art will understand that the operations described below may be performed by any appropriate combination of hardware, software or firmware configured to implement the exemplary techniques described herein. Specific examples of the type of hardware, software or firmware that may be utilized will be described below with regard to FIG. 9.

In 605, one or more training input-output pairs are collected. In this example, each input-output pair may include an SDR detail layer and a corresponding HDR detail layer. Those skilled in the art will understand that the exemplary concepts described herein may be applicable to any appropriate type of image or video data.

Like the method 400, the method 600 will be described with regard to a single pair of training images. However, in an actual training process, a training dataset of multiple pairs of training images may be utilized to train the detail layer reconstruction subnetwork 230.

In 610, a latent representation of the training SDR detail layer is generated. For example, as discussed above with regard to FIGS. 2 and 5, an input image may be encoded by the encoder of the U-net model. In 615, coarse inpainting output is generated by decoding the encoded representation of the SDR detail layer. As indicated above in FIGS. 3 and 5, the coarse inpainting output may then be processed by the inpainting network 235.

In 620, a model for converting SDR detail layer input and a mask into coarse inpainting output is generated based on processing the training dataset using the partial convolutional network 233. Once learned, the model may be used to perform the first stage of the HDR detail layer reconstruction process. For example, within the context of the data flow shown in FIG. 2, this conversion model may be applied to the SDR detail layer input 231 and the mask 232 to generate the coarse inpainting output 234. A more detailed discussion on generating this model is provided below.

The partial convolutional network 233 may use stacked partial convolutional layers (PCL). The PCL contains a partial convolutional operation and a mask update function to perform image inpainting which is represented by the following equation:

$$x' = \begin{cases} W^T(X_c \odot (1 - M_c))\alpha + b, & \text{if } \text{sum}(1 - M_c) > 0 \\ 0, & \text{otherwise} \end{cases}$$

Here, W indicates the weights of convolutional filter, X indicates the feature values for each layer, M represents the corresponding mask. The $\odot$ denotes element-wise multiplication and $\alpha$ is a scaling factor, $$\alpha = \frac{\text{sum}(1)}{\text{sum}(1 - M_c)},$$

to adjust for the varying amount of valid (unmasked) inputs, sum(1) is the sum of all 1 matrix with equal size to the $M_c$. Further, c and b indicate channels and bias respectively.

The location is to be turned valid if the inpainting operation was able to fill at least one valid mask location. The mask may then be updated using the following equation:

$$m' = \begin{cases} 0, & \text{if } \text{sum}(1 - M_c) > 0 \\ 1, & \text{otherwise} \end{cases}$$

The operation and updating mechanism can be implemented in the forward pass in deep learning framework. The partial convolutional network is trained with the reconstruction loss ($\mathcal{L}_{rec}$) and structure loss explicitly. The ($\mathcal{L}_{SSIM}$) explicitly. The reconstruction loss function may be defined using the following equation:

$$\mathcal{L}_{rec} = \mathcal{L}_{hole} + \mathcal{L}_{valid}, \begin{cases} \mathcal{L}_{hole} = \|M \odot (H_d - H_{td})\|_1 \\ \mathcal{L}_{valid} = \|(1 - M) \odot (H_d - H_{td})\|_1 \end{cases}$$

Here, $H_d$ represents the predicted HDR output and $H_{td}$ represents the training HDR output. $\mathcal{L}_{hole}$ and $\mathcal{L}_{valid}$ are the L1 losses on the partial convolutional network 233 output for the hole and the non-hole areas respectively.

To train the inpainting network to produce a visually pleasing image with reasonable textures (structure) in the masked region, the differentiable structure similarity index (SSIM) loss may be employed and the SSIM can be defined as a brightness (l) and a structure (s) similarity terms using the following equation:

$$SSIM(p) = l(p) \cdot s(p) = \frac{2\mu_{H_d}\mu_{H_{td}} + C_1}{\mu_{H_d}^2 + \mu_{H_{td}}^2 + C_1} \cdot \frac{2\sigma_{H_{td}H_d} + C_2}{\sigma_{H_d}^2 + \sigma_{H_{td}}^2 + C_2}$$

Here, p is the pixel of patch P. The loss function for SSIM can then be expressed as the following equation:

$$\mathcal{L}_{SSIM}(P)=1-\text{SSIM}(\hat{p})$$

Here, $\hat{p}$ is the center of patch P. Due to the convolutional nature of the network, the network learns the weights optimizing SSIM for the central pixel, the learned kernel can be applied to the image patch. This may avoid the derivative calculation issue of the Gaussian filter with standard deviation ($\sigma$) in some boundary region of P. The derivatives at $\hat{p}$ with respect to any other pixel q in patch P may be described using the following equation:

$$\frac{\partial \mathcal{L}_{SSIM}(P)}{\partial H_d(q)} = -\frac{\partial}{\partial H_d(q)} \text{SSIM}(\hat{p}) = -\left(\frac{\partial l(\hat{p})}{\partial H_d(q)} \cdot s(\hat{p}) + l(\hat{p}) \cdot \frac{\partial s(\hat{p})}{\partial H_d(q)}\right)$$

Here, $l(\hat{p})$ and $s(\hat{p})$ are the first and second term of SSIM(p) equation described above. To capture characteristics of both reconstruction loss and structure similarity loss functions, they may be combined using the following equation:

$$\mathcal{L}_{p-conv}=\alpha \cdot \mathcal{L}_{rec}+(1-\alpha) \cdot \mathcal{L}_{SSIM}$$

Figure 7:
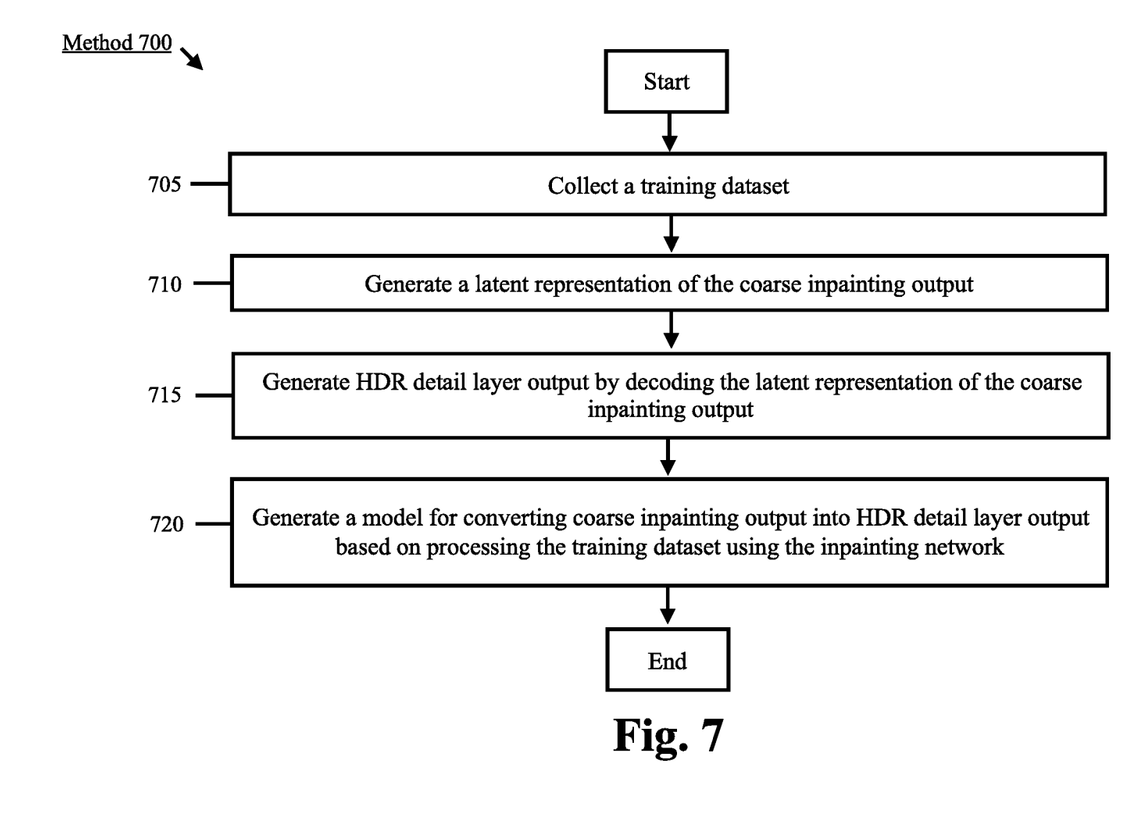
FIG. 7 shows a method for training the inpainting network of the detail layer reconstruction subnetwork according to various exemplary embodiments.

FIG. 7 shows a method 700 for training the inpainting network 235 of the detail layer reconstruction subnetwork 230 according to various exemplary embodiments. Those skilled in the art will understand that the operations described below may be performed by any appropriate combination of hardware, software or firmware configured to implement the exemplary techniques described herein. Specific examples of the type of hardware, software or firmware that may be utilized will be described below with regard to FIG. 9.

In 705, a training dataset is collected. As indicated above, the inpainting network 235 is the second stage of the detail layer reconstruction subnetwork 230. Thus, the data output by the partial convolutional network 233 and used to train the partial convolutional network 233 may be used to train the inpainting network 235. Accordingly, in addition to the training input-output pairs collected for training the partial convolutional network 233 (as shown in the method 600 of FIG. 6), the training dataset may also include the coarse inpainting output from the partial convolutional network 233.

In 710, a latent representation of the coarse inpainting output is generated. In 715, HDR detail layer output is generated by decoding the latent representation.

In 720, a model for converting coarse inpainting output into HDR detail layer output is generated based on processing the training dataset using the inpainting network 235. Once learned, the model may be used to perform the second stage of the HDR detail layer reconstruction process. For example, within the context of the data flow shown in FIG. 2, this conversion model may be applied to the coarse inpainting output 234 to generate the HDR detail layer output 236. A more detailed discussion on generating this model is provided below.

The detail layer contains meaningful high frequency texture details in the unsaturated regions. However, the network may lack enough information to learn contextual information in the saturated regions due to a shortage of contextual features from distant spatial locations. To address this issue, the inpainting network 235 is configured to follow the partial convolutional network 233.

The inpainting network 235 contains a contextual attention layer that learns where to copy feature information from known surrounding features in latent space to generate meaningful texture in masked locations. For each patch, the similarity ($\mathbb{S}_{i,i'}$) between the previous inpainted masked feature ($\mathbb{F}_i$) with the surrounding features from the unmasked region ($\mathbb{G}_{i'}$) of an inner product space is measured using the following equation:

$$\mathbb{S}_{i,i'} = \frac{\mathbb{F}_i \cdot \mathbb{G}_{i'}}{\|\mathbb{F}_i\|\|\mathbb{G}_{i'}\|}$$

Here, i and i' denote the feature index of $\mathbb{F}$ and $\mathbb{G}$ respectively. The similarity store is then scaled by softmax for deriving a contextual attention score using the following formula:

$$\mathcal{A}_i=\text{softmax}_i(\lambda \mathbb{S}_{i,i'})$$

Here, $\lambda$ is a constant factor. The convolutional and channel-wise softmax are implemented for similarity comparison. Then, the deconvolution may be applied for detail reconstruction from the latent space.

The inpainting network is trained with a composed loss function ($\mathcal{L}_{context}$) including reconstruction, structure similarity and adversarial loss, where the reconstruction and structure similarity losses are the same loss function used in the partial convolutional network 233 $\mathcal{L}_{rec}$ and $\mathcal{L}_{SSIM}$. However only using pixel level loss functions may lead to blurry outputs. To address this issue, a Wasserstein Generative Adversarial Network with Gradient Penalty (WGAN-GP) may be employed.

Further, WGAN loss ($\mathcal{L}_{WGAN}$) may be attached to both over-saturated regions (masked) and hole image to smooth the consistency between inside and outside the mask. The WGAN-GP also uses the $L_1$ based Wasserstein distance metric (W) which mathematically defines the greatest lower bound (inf) of the traveling distance $\|x-y\|$ using the following equation:

$$W(\mathbb{P}_r, \mathbb{P}_g) = \inf_{\gamma \in \prod(\mathbb{P}_r,\mathbb{P}_g)} \mathbb{E}_{(x,y) \sim \gamma}[\|x - y\|]$$

Here, $\mathbb{P}_r$ and $\mathbb{P}_g$ denote the ground truth and the generated data distribution respectively. $\pi()$ denotes the set of all possible joint probability distributions $\gamma$ whose marginals are respectively $\mathbb{P}_r$ and $\mathbb{P}_g$. The W is the minimum cost of transporting mass in converting the generated data distribution $\mathbb{P}_g$ to the ground truth data distribution $\mathbb{P}_r$ while WGAN implicitly learns the distribution and trains the generator to match with the distribution of the current ground truth image. The composed loss function of the contextual inpainting network 235 may be represented by the following equation:

$$\mathcal{L}_{context}=c_1 \cdot \mathcal{L}_{rec}+c_2 \cdot \mathcal{L}_{SSIM}+c_3 \cdot \mathcal{L}_{WGAN}$$

Figure 8:
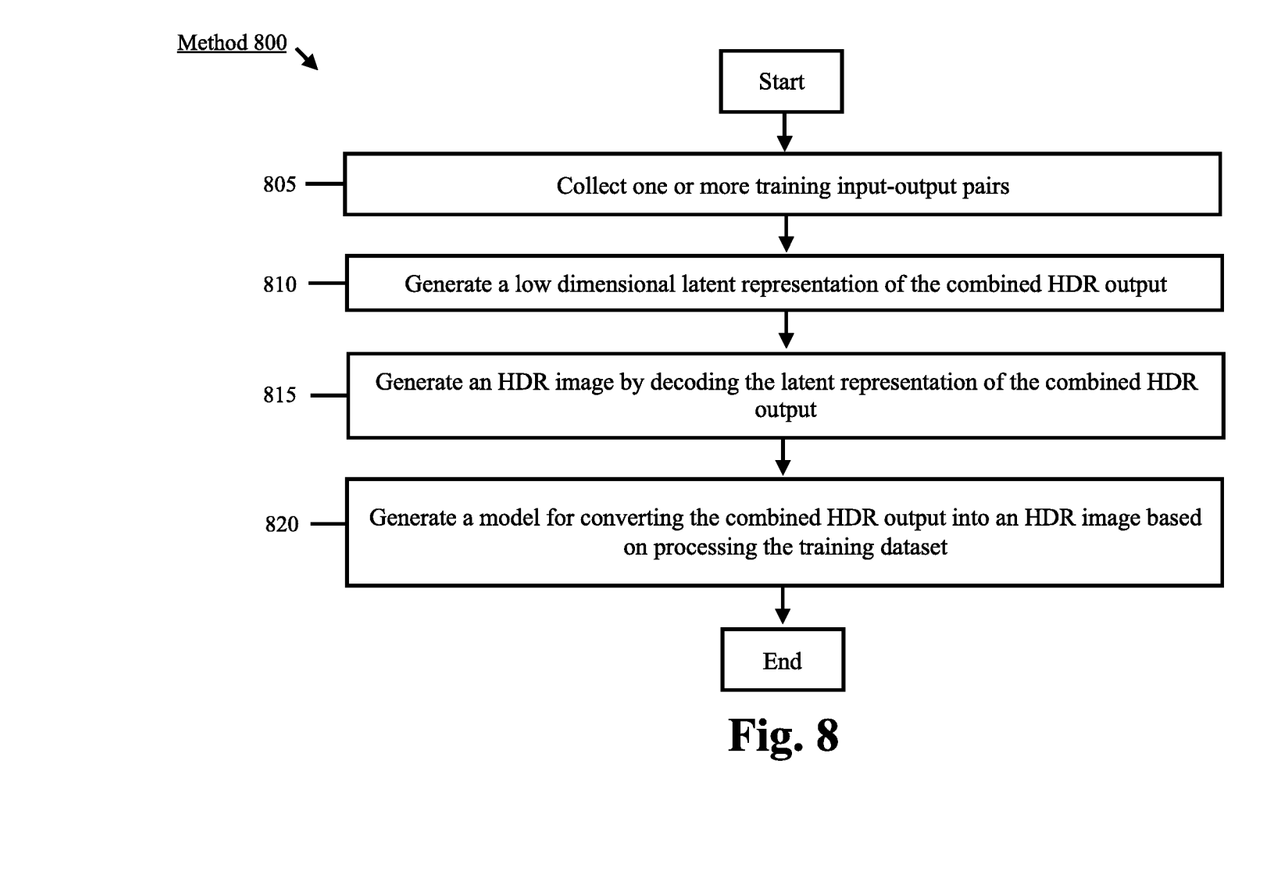
FIG. 8 shows a method for training the refinement subnetwork according to various exemplary embodiments.

FIG. 8 shows a method 800 for training the refinement subnetwork 240 according to various exemplary embodiments. Those skilled in the art will understand that the operations described below may be performed by any appropriate combination of hardware, software or firmware configured to implement the exemplary techniques described herein. Specific examples of the type of hardware, software or firmware that may be utilized will be described below with regard to FIG. 9.

In 805, one or more training input-output pairs are collected. In this example, each input-output pair may include combined HDR output and a corresponding HDR image.

The combined output may be generated based on the output from the base layer reconstruction subnetwork 220 and the detail layer reconstruction subnetwork 230. Those skilled in the art will understand that the exemplary concepts described herein may be applicable to any appropriate type of image or video data.

Like the method 400, the method 800 will be described with regard to a single pair of training images. However, in an actual training process, a training dataset of multiple pairs of training images may be utilized to train the refinement subnetwork 240.

In 810, a low dimensional latent representation of the combined HDR output is generated. The refinement subnetwork 240 and the base layer reconstruction subnetwork 220 both employ the autoencoder network architecture. Thus, the combined HDR output may be encoded by the autoencoder architecture. In 815, an HDR image is generated by decoding the low latent representation of the combined HDR output.

In 820, a combined HDR output to HDR image conversion model is generated based on processing the training dataset. Once learned, the model may be used to convert the combined HDR output into an HDR image. For example, within the context of the data flow shown in FIG. 2, this conversion model may be applied to the combined HDR output 242 to generate the HDR image 110. A more detailed discussion on generating this model is provided below.

The refinement subnetwork 240 applies the finishing touches to the combined HDR output. For example, the refinement subnetwork 240 may remove undesired artifacts included in the combined HDR output. As indicated above, the refinement subnetwork 240 shares the same architecture as the base layer reconstruction subnetwork 220. Thus, generating this conversion model is substantially similar to generating the SDR base layer input to HDR base layer output conversion mode described above with regard to FIG. 4.

The loss function of the refinement subnetwork 240 uses the combined HDR output ($H_{co}$) and a training HDR image ($H_t$) and may be represented by the following equation:

$$\mathcal{L}_{HDR} = \frac{1}{n}\sum_{i=1}^{n}|H_t - H_{co}|$$

Here, n represents the number of pixels and i represents the pixel index.

Figure 9:
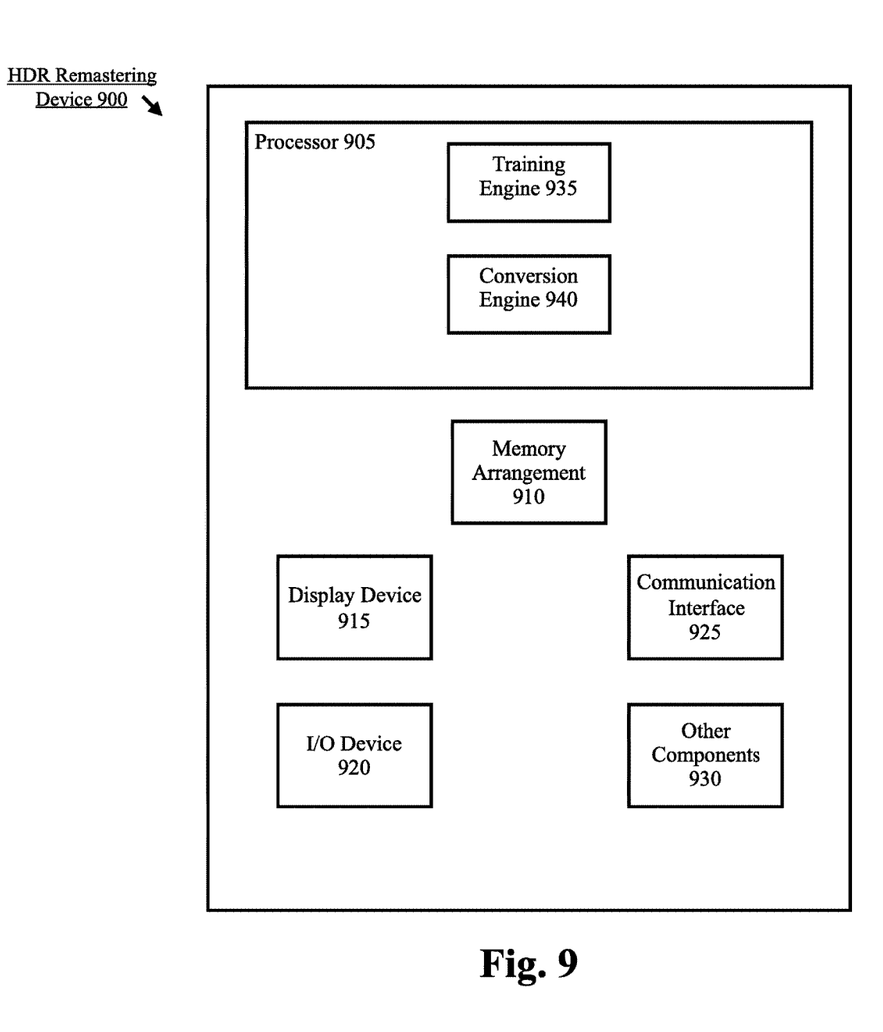
FIG. 9 shows an HDR remastering device according to various exemplary embodiments.

FIG. 9 shows an HDR remastering device 900 according to various exemplary embodiments. The HDR remastering device 900 may represent any electronic device that is configured with the hardware, software or firmware to generate HDR content from SDR content. For example, the HDR remastering device 900 may be a server, a desktop computer, a mobile phone, a tablet computer, a smartphone, an of Internet of Things (IoT) devices, etc.

The HDR remastering device 900 may include a processor 905, a display device 910, an input/output (I/O) device 915, a memory arrangement 920, a communication interface 925, and other components 930.

The display device 910 may be a hardware component configured to present a graphical display. The I/O device 915 may be a hardware component that enables the user to enter inputs. In one example, the display device 910 and the I/O device 915 may be integrated together such as a touchscreen. In another example, the I/O device 915 may be represented as one or more buttons. The communication interface 925 may be a hardware component configured to communicate with a network over a wireless or wired connection. The communication interface 925 may also be configured to communicate with other devices using a wired or wireless connection.

The processor 905 may be configured to execute a plurality of engines for the HDR remastering device 900. For example, the engines may include a training engine 735 and a conversion engine 940. The training engine 935 may perform a variety of different operations related to training a neural network. As indicated above, this may include training the base layer reconstruction subnetwork 920, the detail layer reconstruction subnetwork 930 and the refinement subnetwork 940. The conversion engine 940 may perform various operations related to converting SDR content into HDR content.

The above referenced engines each being an application (e.g., a program) executed by the processor 905 is only exemplary. The functionality associated with the engines may also be represented as a separate incorporated component of the HDR remastering device 900 or may be a modular component coupled to the HDR remastering device 900, e.g., an integrated circuit with or without firmware. For example, the integrated circuit may include input circuitry to receive signals and processing circuitry to process the signals and other information. The engines may also be embodied as one application or separate applications. In addition, the functionality described for the processor 905 may be split among two or more processors. The exemplary embodiments may be implemented in any of these or other configurations of a monitoring device.

The memory arrangement 930 may be a hardware component configured to store data related to operations performed by the HDR remastering device 900. The other components 930 may include, for example, ports to electronically connect to other devices.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows platform, a Mac platform and MAC OS, a Linux based OS, a mobile device having an operating system such as iOS, Android, etc. In a further example, the exemplary embodiments of the above described method may be embodied as a computer program product containing lines of code stored on a computer readable storage medium that may be executed on a processor or microprocessor. The storage medium may be, for example, a local or remote data repository compatible or formatted for use with the above noted operating systems using any storage operation.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A method comprising:
    receiving a standard dynamic range (SDR) image;
    decomposing the SDR image into a base layer of the SDR image and a detail layer of the SDR image;
    processing the base layer of the SDR image using a first neural network to generate a base layer of a high dynamic range (HDR) image;
    generating a mask;
    processing the mask and the detail layer of the SDR image using a second neural network to generate a coarse inpainting output used for generating a detail layer of the HDR image;
    combining the base layer of the HDR image and the detail layer of the HDR image to generate a combined HDR output; and
    processing the combined HDR output using a third fully neural network to generate the HDR image.

2. The method of claim 1, wherein the first neural network is a fully convolutional autoencoder neural network, the second neural network is a partially convolutional autoencoder neural network, and the third neural network is another fully convolutional autoencoder neural network.

3. The method of claim 2, wherein the first neural network is trained to convert an encoded representation of the base layer of the SDR image to the base layer of the HDR image by decoding an encoded representation of the base layer of the SDR image.

4. The method of claim 2, wherein the third neural network is trained to convert an encoded representation of the combined HDR output to the HDR image by decoding the encoded representation of the combined HDR output.

5. The method of claim 1, wherein processing the mask and the detail layer of the SDR image includes processing the coarse inpainting output using an inpainting network to generate the detail layer of the HDR image.

6. The method of claim 1, wherein decomposing the SDR image includes:
    filtering the SDR image to generate the base layer of the SDR image; and
    dividing the SDR image by the base layer of the SDR image to generate the detail layer of the SDR image.

7. The method of claim 6, wherein filtering the SDR image includes filtering the SDR image using a weighted least squares (WLS) filter.

8. A device comprising:
    a communication interface; and
    a processor configured to perform operations, the operations comprising:
        receiving a standard dynamic range (SDR) image;
        decomposing the SDR image into a base layer of the SDR image and a detail layer of the SDR image;
        processing the base layer of the SDR image using a first neural network to generate a base layer of a high dynamic range (HDR) image;
        generating a mask;
        processing the mask and the detail layer of the SDR image using a second neural network to generate a coarse inpainting output used for generating a detail layer of the HDR image;
        combining the base layer of the HDR image and the detail layer of the HDR image to generate a combined HDR output; and
        processing the combined HDR output using a third fully neural network to generate the HDR image.

9. The device of claim 8, wherein the first neural network is a fully convolutional autoencoder neural network, the second neural network is a partially convolutional autoencoder neural network, and the third neural network is another fully convolutional autoencoder neural network.

10. The device of claim 9, wherein the first neural network is trained to convert an encoded representation of the base layer of the SDR image to the base layer of the HDR image by decoding an encoded representation of the base layer of the SDR image.

11. The device of claim 9, wherein the third neural network is trained to convert an encoded representation of the combined HDR output to the HDR image by decoding the encoded representation of the combined HDR output.

12. The device of claim 8, wherein processing the mask and the detail layer of the SDR image includes processing the coarse inpainting output using an inpainting network to generate the detail layer of the HDR image.

13. The device of claim 8, wherein decomposing the SDR image includes:
    filtering the SDR image to generate the base layer of the SDR image; and
    dividing the SDR image by the base layer of the SDR image to generate the detail layer of the SDR image.

14. The device of claim 13, wherein filtering the SDR image includes filtering the SDR image using a weighted least squares (WLS) filter.

* * * * *